US012325826B2

(12) United States Patent
Zeng et al.

(10) Patent No.: US 12,325,826 B2
(45) Date of Patent: Jun. 10, 2025

(54) HIGH-FLOW-CONDUCTIVITY PROPPANT AND PREPARATION METHOD THEREOF

(71) Applicant: Southwest Petroleum University, Chengdu (CN)

(72) Inventors: Dezhi Zeng, Chengdu (CN); Chengxiu Yu, Chengdu (CN); Hanwen Zhang, Chengdu (CN); Xi Wang, Chengdu (CN); Jiancheng Luo, Chengdu (CN); Chunyan Zheng, Chengdu (CN); Ruikang Ke, Chengdu (CN); Huan Xiao, Chengdu (CN); Gang Tian, Chengdu (CN)

( * ) Notice: Subject to any disclaimer, the term of this patent is extended or adjusted under 35 U.S.C. 154(b) by 0 days.

(21) Appl. No.: 19/009,926

(22) Filed: Jan. 4, 2025

(65) Prior Publication Data

US 2025/0136860 A1    May 1, 2025

(30) Foreign Application Priority Data

Mar. 12, 2024    (CN) .......................... 202410277848.2

(51) Int. Cl.
    *C09K 8/80*    (2006.01)
(52) U.S. Cl.
    CPC .................................. *C09K 8/805* (2013.01)
(58) Field of Classification Search
    CPC ..................................................... C09K 8/805
    See application file for complete search history.

(56) References Cited

U.S. PATENT DOCUMENTS

| 2011/0297383 | A1 | 12/2011 | Tanguay et al. |
| 2013/0068460 | A1 | 3/2013 | Kumar et al. |
| 2014/0196898 | A1 | 7/2014 | Tanguay et al. |
| 2016/0115375 | A1* | 4/2016 | Loricourt ............ C04B 35/1115 |
| | | | 428/397 |
| 2017/0121595 | A1* | 5/2017 | Faucher .................... C04B 5/00 |

OTHER PUBLICATIONS

CNIPA, Notification to grant patent right for Chinese application CN202410277848.2, Apr. 18, 2024.

* cited by examiner

*Primary Examiner* — Aiqun Li
(74) *Attorney, Agent, or Firm* — Hemisphere Law, PLLC; Zhigang Ma

(57) ABSTRACT

The disclosure belongs to the technical field of well completion engineering in oil and gas engineering, and particularly relates to a high-flow-conductivity proppant and its preparation method. The high-flow-conductivity proppant includes dumbbell-shaped framework granules and an oil-soluble film coating layer coated on the surfaces of the framework granules; the oil-soluble film coating layer melts when meeting oil at the temperature of 30-120° C. The high-flow-conductivity proppant prepared by the method has low bulk density, and the problems that the traditional proppant cannot be transported to the far end of a crack, has poor flow conductivity and the like can be effectively solved.

8 Claims, 1 Drawing Sheet

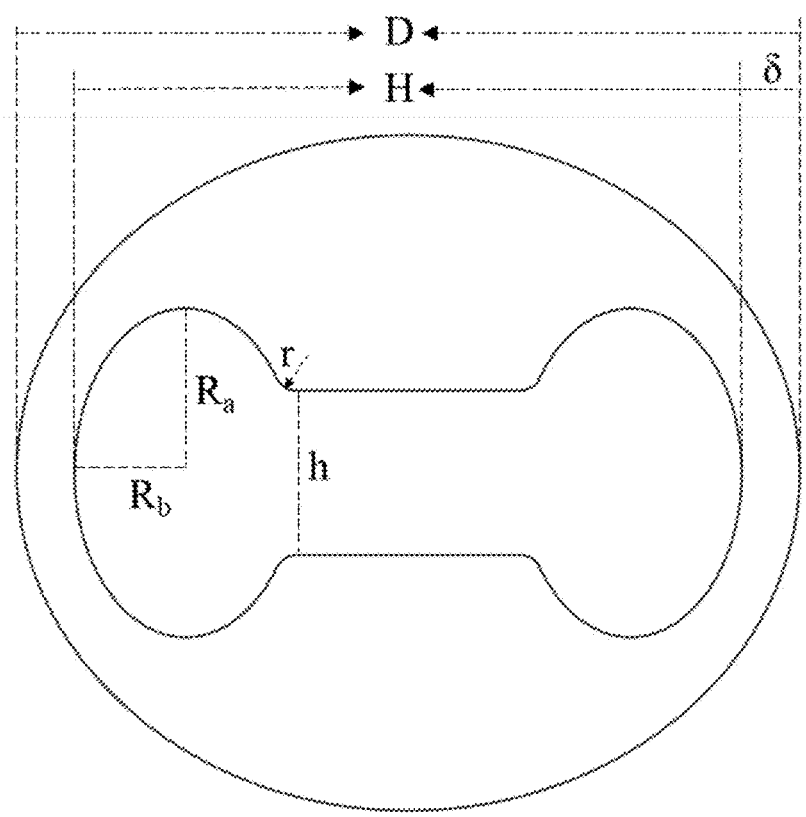

HIGH-FLOW-CONDUCTIVITY PROPPANT AND PREPARATION METHOD THEREOF

TECHNICAL FIELD

The disclosure belongs to the technical field of well completion engineering in oil and gas engineering, and particularly relates to a high-flow-conductivity proppant and its preparation method.

BACKGROUND ART

Proppant, as an important material in the exploitation process of unconventional oil and gas fields, plays a vital role in improving the recovery ratio of unconventional oil and gas. The traditional quartz sand proppant and ceramsite proppant have the characteristic of higher density, so that the sedimentation speed in fracturing fluid is higher, the proppant cannot be transported to the far end of a crack, and the sand blocking phenomenon is easy to occur, so that the conductivity of the crack is reduced; while, the existing film-coated proppant has smaller density, but the resin layer of the film is easy to soften and adhere under the conditions of deep high temperature and high closing pressure, so that the conductivity is poor; when the binding force between the coating layer and the middle framework granules is insufficient, the proppant backflow phenomenon can be caused in the production process, so that cracks are closed again, which is not conducive to the production of unconventional oil and gas.

SUMMARY

In view of the above, the disclosure aims to overcome the defects of the prior art, and provides the high-flow-conductivity proppant and the its preparation method through technical innovation, which solve the problems that the proppant cannot be transported to the far end of a crack by fracturing fluid due to the fact that the density of the traditional quartz sand and ceramsite proppant is high, and the coated proppant has the problems of poor conductivity and the like because the coated layer is easy to soften and adhere under high temperature and high pressure.

In order to solve the technical problems, the technical scheme of the disclosure is as follows:

the first technical purpose of the disclosure is to provide a high-flow-conductivity proppant, which includes dumbbell-shaped framework granules and an oil-soluble film coating layer coated on the surfaces of the dumbbell-shaped framework granules; wherein, the dumbbell-shaped framework granules have a long diameter H of 400-825 μm, an outer radius r of 10-15 μm, an inner long radius $R_a$ of 103-122 μm, an inner short radius $R_b$ of 85-170 μm, and a trunk h of 85-170 μm;

the oil-soluble film coating layer melts when meeting oil at a temperature of 30-120° C., and a minimum thickness δ of the oil-soluble film coating layer is 12.5-25 μm;

a granule size D of the high-flow-conductivity proppant is 425-850 μm, and a relation among the granule size D, the long diameter H of dumbbell-shaped framework granules and the minimum thickness δ of the oil-soluble film coating layer is as follows: D=H+2δ;

the dumbbell-shaped framework granules include the following raw material components in percentage by weight:

70-80 wt % of $Al_2O_3$ powder, 1-10 wt % of $TiO_2$ powder, 4-12 wt % of MgO powder, and 2-8 wt % of $CaCO_3$ powder;

the oil-soluble film coating layer includes the following raw material components in percentage by weight:

40-60 wt % of petroleum resin, 30-50 wt % of modified phenolic resin, 1-3 wt % of surfactant, 3-6 wt % of hydroxypropyl cellulose and 0.1-0.5 wt % of dibutyl phthalate.

It should be noted that when the mass ratio of the dumbbell-shaped framework granules to the oil-soluble coating film layer is 30-40 wt %, the oil-soluble coating film layer can reach a minimum thickness.

The high-flow-conductivity proppant has a bulk density of 1.2-1.5 g/cm³, and the dumbbell-shaped framework granules have a bulk density of 2.4-2.7 g/cm³.

Further, a granule size of the $Al_2O_3$ powder is 1-5 μm, a granule size of the $TiO_2$ powder is 0.5-1 μm, a granule size of the MgO powder is 1-2 μm, and a granule size of the $CaCO_3$ powder is 1-3 μm.

Further, the petroleum resin is any one of aliphatic resin, aromatic resin and alicyclic resin, the modified phenolic resin is any one of organosilicon modified phenolic resin and xylene modified phenolic resin, and the surfactant is any one of fatty acid monoglyceride and fatty acid diglyceride.

The second technical purpose of the disclosure is to provide a preparation method of preparing the high-flow-conductivity proppant, which includes the following steps:

step 1: putting $Al_2O_3$ powder, $TiO_2$ powder, MgO powder and $CaCO_3$ powder into a ball mill in proportion for ball milling for 24 h to obtain a mixed powder, putting the mixed powder into a mixer, and adding an aluminum dihydrogen phosphate liquid for stirring to obtain a uniform mixture;

step 2: putting the uniform mixture obtained in step 1 into a dumbbell mould for molding to obtain dumbbell-shaped granules, and then putting the dumbbell-shaped granules into an oven for drying for 2-3 h;

step 3: putting the dried dumbbell-shaped granules obtained in the step 2 into an electric furnace for sintering at 1320-1380° C. to form dumbbell-shaped framework granules, and cooling the same for later use;

step 4: mixing petroleum resin, modified phenolic resin, surfactant and hydroxypropyl cellulose in proportion, heating the same to obtain a mixture in molten state, adding dibutyl phthalate, and stirring uniformly to form a gel solution;

step 5: putting the dumbbell-shaped framework granules obtained in the step 3 and the gel solution obtained in the step 4 into a sugar coater for rotation until the gel solution is uniformly coated on surfaces of the dumbbell-shaped framework granules to form a spherical proppant;

step 6: adding a lubricant into the spherical proppant obtained in the step 5 and stirring uniformly, cooling and screening to obtain a finished product, namely the high-flow-conductivity proppant.

Optionally, in step 1, a mass ratio of the $Al_2O_3$ powder, $TiO_2$ powder, MgO powder and $CaCO_3$ powder is (70-80):(1-10):(4-12):(2-8), and the additive amount of the aluminum dihydrogen phosphate liquid is 2-5 wt % of the mass of the dumbbell-shaped framework granule raw material.

Optionally, in step 4, the mass ratio of the petroleum resin, modified phenolic resin, surfactant, hydroxypropyl cellulose and dibutyl phthalate is (40-60):(30-50):(1-3):(3-6):(0.1-0.5).

Optionally, in step 6, the lubricant is calcium stearate, and the additive amount of the lubricant is 1-2% of the mass of the high-flow-conductivity proppant.

Compared with the prior art, the disclosure has the advantages as follows:

1) The high-flow-conductivity proppant provided by the present disclosure sequentially includes dumbbell-shaped framework granules and an oil-soluble film coating layer from inside to outside, wherein the bulk density of the high-flow-conductivity proppant is 1.2-1.5 g/cm$^3$, the fracturing fluid can smoothly convey the high-flow-conductivity proppant to the far end of the crack, and during normal production of oil well, the oil-soluble film coating layer can be melted when meeting oil at the temperature of 30-120° C., and only dumbbell-shaped frameworks are accumulated in the far end of the crack. The bulk density of dumbbell-shaped framework granules is 2.4-2.7 g/cm$^3$, which is not easy to cause backflow. Crude oil can be stably produced through gaps among the dumbbell-shaped frameworks.

2) According to the disclosure, the two ends of the dumbbell-shaped framework granules are in an ellipsoidal shape, the ellipsoids are connected with the middle trunk by round corners, so that stress concentration is effectively prevented, and the dumbbell-shaped framework granules includes $Al_2O_3$ powder, $TiO_2$ powder, MgO powder and $CaCO_3$ powder, which not only have higher compressive strength than the traditional quartz sand proppant, but also have stable chemical properties, salt resistance, high temperature resistance, corrosion resistance and other properties.

3) The stacking gap of dumbbell-shaped framework granules is about 2 times higher than that of spherical proppants, and the dumbbell-shaped framework granules have higher conductivity.

BRIEF DESCRIPTION OF THE DRAWINGS

In order to more clearly illustrate the embodiments of the present disclosure or the technical solutions in the prior art, the drawings that are required to be used in the embodiments or the description of the prior art will be briefly described below, and it is obvious that the drawings in the following description are only embodiments of the present disclosure, and that other drawings can be obtained according to the provided drawings without inventive effort for a person skilled in the art.

FIG. 1 is a schematic structural diagram of a high-flow-conductivity proppant prepared in accordance with the present disclosure.

DETAILED DESCRIPTION OF THE EMBODIMENTS

The following clearly and completely describes the technical solutions in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall belong to the scope of protection of the present disclosure.

For the special word "embodiment" herein, any embodiment described as "exemplary" is not necessarily to be construed as preferred or advantageous over other embodiments. In the performance index test in the embodiments of the present application, unless specified otherwise, a conventional test method in the art is used. It should be understood that the terminology set forth herein is for describing particular embodiments only and is not intended to limit the disclosure of the present application.

Unless otherwise indicated, technical and scientific terms used herein have the same meaning as commonly understood by one of ordinary skill in the art to which this application belongs; other test methods and technical means not specifically mentioned in the present application refer to the test methods and technical means commonly used by those skilled in the art.

In order to better explain the content of the present application, numerous specific details are given in the following specific embodiments. A person skilled in the art should understand that the present application can also be implemented without some specific details. In the embodiment, some methods, means, instruments, devices, and the like, which are well known to a person skilled in the art, are not described in detail, so as to highlight the subject matter of the present application. Without any conflict, the technical features disclosed in the embodiments of the present application can be combined in any way, and the obtained technical solutions belong to the contents disclosed in the embodiments of the present application.

As shown in FIG. 1, the high-flow-conductivity proppant includes dumbbell-shaped framework granules and an oil-soluble film coating layer coated on the surfaces of the dumbbell-shaped framework granules; wherein, the dumbbell-shaped framework granules have a long diameter H of 400-825 μm, an outer radius r of 10-15 μm, an inner long radius $R_a$ of 103-122 μm, an inner short radius $R_b$ of 85-170 μm, and a trunk h of 85-170 μm;

the granule size D of the high-flow-conductivity proppant is 425-850 μm, and the relation among the granule size D, the long diameter H of dumbbell-shaped framework granules and the minimum thickness δ of the oil-soluble film coating layer is as follows: D=H+2δ;

In order to better understand the present disclosure, the present disclosure is further illustrated in detail through the following embodiments, but it should not be understood that the present disclosure is limited thereto. For those skilled in the art, non-essential improvements and adjustments made according to the above content of the present disclosure should also fall within the scope of protection of the present disclosure.

Embodiment 1

The preparation method of a high-flow-conductivity proppant included the following steps:

step 1: $Al_2O_3$ powder, $TiO_2$ powder, MgO powder and $CaCO_3$ powder were put into a ball mill in a proportion of 70:10:12:8 for ball milling for 24 h to obtain a mixed powder, then the mixed powder was put into a mixer, the aluminum dihydrogen phosphate liquid was added (the amount was 2% of the mass of the dumbbell-shaped framework granule raw material), and stirring was performed to obtain a uniform mixture;

step 2: the uniform mixture was put into a dumbbell-shaped mould for molding to obtain dumbbell-shaped granules, and then the dumbbell-shaped granules were put into an oven for drying for 2-3 h;

step 3: the dried dumbbell-shaped granules were put into an electric furnace for sintering at 1320-1380° C. to form dumbbell-shaped framework granules, which were then cooled for later use;

step 4: petroleum resin, modified phenolic resin, surfactant and hydroxypropyl cellulose were mixed in a proportion of 45:50:1:4, and the same was heated to obtain a mixture in molten state, then dibutyl phthalate was added (the amount was 0.3% of the mass of the mixture in molten state), and stirring was performed to form a uniform gel solution;

step 5: the dumbbell-shaped framework granules and the gel solution were put into a sugar coater for rotation until the gel solution was uniformly coated on surfaces of the dumbbell-shaped framework granules to form a spherical proppant;

step 6: calcium stearate (the amount was 1% of the mass of the proppant) was added into to the spherical proppant, stirred evenly, cooled and sieved to obtain a finished high-flow-conductivity proppant.

Preferably, the petroleum resin was aliphatic resin.

Preferably, the modified phenolic resin was organosilicon modified phenolic resin.

Preferably, the surfactant was fatty acid monoglyceride.

Embodiment 2

The preparation method of a high-flow-conductivity proppant included the following steps:

step 1: $Al_2O_3$ powder, $TiO_2$ powder, MgO powder and $CaCO_3$ powder were put into a ball mill in a proportion of 70:10:12:8 for ball milling for 24 h to obtain a mixed powder, then the mixed powder was put into a mixer, the aluminum dihydrogen phosphate liquid was added (the amount was 2% of the mass of the dumbbell-shaped framework granule raw material), and stirring was performed to obtain a uniform mixture;

step 2: the uniform mixture was put into a dumbbell-shaped mould for molding to obtain dumbbell-shaped granules, and then the dumbbell-shaped granules were put into an oven for drying for 2-3 h;

step 3: the dried dumbbell-shaped granules were put into an electric furnace for sintering at 1320-1380° C. to form dumbbell-shaped framework granules, which were then cooled for later use;

step 4: petroleum resin, modified phenolic resin, surfactant and hydroxypropyl cellulose were mixed in a proportion of 50:45:1:4, and the same was heated to obtain a mixture in molten state, then dibutyl phthalate was added (the amount was 0.2% of the mass of the mixture in molten state), and stirring was performed to form a uniform gel solution;

step 5: the dumbbell-shaped framework granules and the gel solution were put into a sugar coater for rotation until the gel solution was uniformly coated on surfaces of the dumbbell-shaped framework granules to form a spherical proppant;

step 6: calcium stearate (the amount was 1% of the mass of the proppant) was added into to the spherical proppant, stirred evenly, cooled and sieved to obtain a finished high-flow-conductivity proppant.

Preferably, the petroleum resin was aliphatic resin.

Preferably, the modified phenolic resin was organosilicon modified phenolic resin.

Preferably, the surfactant was fatty acid diglyceride.

Embodiment 3

The preparation method of a high-flow-conductivity proppant included the following steps:

step 1: $Al_2O_3$ powder, $TiO_2$ powder, MgO powder and $CaCO_3$ powder were put into a ball mill in a proportion of 80:5:10:5 for ball milling for 24 h to obtain a mixed powder, then the mixed powder was put into a mixer, the aluminum dihydrogen phosphate liquid was added (the amount was 4% of the mass of the dumbbell-shaped framework granule raw material), and stirring was performed to obtain a uniform mixture;

step 2: the uniform mixture was put into a dumbbell-shaped mould for molding to obtain dumbbell-shaped granules, and then the dumbbell-shaped granules were put into an oven for drying for 2-3 h;

step 3: the dried dumbbell-shaped granules were put into an electric furnace for sintering at 1320-1380° C. to form dumbbell-shaped framework granules, which were then cooled for later use;

step 4: petroleum resin, modified phenolic resin, surfactant and hydroxypropyl cellulose were mixed in a proportion of 50:45:1:4, and the same was heated to obtain a mixture in molten state, then dibutyl phthalate was added (the amount was 0.2% of the mass of the mixture in molten state), and stirring was performed to form a uniform gel solution;

step 5: the dumbbell-shaped framework granules and the gel solution were put into a sugar coater for rotation until the gel solution was uniformly coated on surfaces of the dumbbell-shaped framework granules to form a spherical proppant;

step 6: calcium stearate (the amount was 2% of the mass of the proppant) was added into to the spherical proppant, stirred evenly, cooled and sieved to obtain a finished high-flow-conductivity proppant.

Preferably, the petroleum resin was aromatic resin.

Preferably, the modified phenolic resin was organosilicon modified phenolic resin.

Preferably, the surfactant was fatty acid monoglyceride.

Embodiment 4

The preparation method of a high-flow-conductivity proppant included the following steps:

step 1: $Al_2O_3$ powder, $TiO_2$ powder, MgO powder and $CaCO_3$ powder were put into a ball mill in a proportion of 80:5:10:5 for ball milling for 24 h to obtain a mixed powder, then the mixed powder was put into a mixer, the aluminum dihydrogen phosphate liquid was added (the amount was 4% of the mass of the dumbbell-shaped framework granule raw material), and stirring was performed to obtain a uniform mixture;

step 2: the uniform mixture was put into a dumbbell-shaped mould for molding to obtain dumbbell-shaped granules, and then the dumbbell-shaped granules were put into an oven for drying for 2-3 h;

step 3: the dried dumbbell-shaped granules were put into an electric furnace for sintering at 1320-1380° C. to form dumbbell-shaped framework granules, which were then cooled for later use;

step 4: petroleum resin, modified phenolic resin, surfactant and hydroxypropyl cellulose were mixed in a proportion of 45:50:1:4, and the same was heated to obtain a mixture in molten state, then dibutyl phthalate was added (the amount was 0.3% of the mass of the mixture in molten state), and stirring was performed to form a uniform gel solution;

step 5: the dumbbell-shaped framework granules and the gel solution were put into a sugar coater for rotation until the gel solution was uniformly coated on surfaces of the dumbbell-shaped framework granules to form a spherical proppant;

step 6: calcium stearate (the amount was 2% of the mass of the proppant) was added into to the spherical proppant, stirred evenly, cooled and sieved to obtain a finished high-flow-conductivity proppant.

Preferably, the petroleum resin was alicyclic resin.

Preferably, the modified phenolic resin was organosilicon modified phenolic resin.

Preferably, the surfactant was fatty acid monoglyceride.

In order to further demonstrate the beneficial effects of the present disclosure for a better understanding of the present disclosure, the technical features disclosed herein are further elucidated by the following conventional index data, but are not to be construed as limiting the present disclosure. Other modifications of the disclosure which do not involve the inventive work, as would occur to those skilled in the art in light of the foregoing teachings, are also considered to be within the scope of the disclosure.

TABLE 1

Conventional indexes of high-flow-conductivity proppants and dumbbell-shaped framework granules produced in embodiments 1-4

| Test Item | Proppant Type | Proppant Crushing Rate Under Closing Pressure of 35 MPa (%) | Bulk Density (g/cm$^3$) | Oil Solubility of Oil-soluble film coating layer at 60° C. (%) |
|---|---|---|---|---|
| Industry Standard | Quartz Sand | ≤8.00 | — | — |
| Embodiment 1 | high-flow- | 5.50 | 1.29 | 98.6 |
| Embodiment 2 | conductivity | 5.20 | 1.35 | 98.0 |
| Embodiment 3 | Proppant | 5.00 | 1.40 | 97.8 |
| Embodiment 4 |  | 4.20 | 1.44 | 97.4 |
| Embodiment 1 | Dumbbell- | 7.00 | 2.57 | — |
| Embodiment 2 | shaped | 6.40 | 2.60 | — |
| Embodiment 3 | Framework | 6.00 | 2.61 | — |
| Embodiment 4 | Granules | 5.50 | 2.65 | — |

As can be seen from Table 1, the high-flow-conductivity proppant and dumbbell-shaped framework granules prepared by the preparation method of the high-flow-conductivity proppant provided in the present disclosure have higher crushing rates under the pressure of 35 MPa than the industry standard of quartz sand proppants; the bulk density of high-flow-conductivity proppant is less than 1.5 g/cm$^3$, and the fracturing fluid can smoothly convey the high-flow-conductivity proppant to the far end of the crack; the oil-soluble film coating layer has an oil solubility of more than 95% at 60° C., and melts when meeting oil during normal production of an oil well, and only dumbbell-shaped frameworks are stacked in the far end of a crack, wherein the bulk density of dumbbell-shaped framework granules is 2.4-2.7 g/cm$^3$, which is not easy to cause backflow phenomenon.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A high-flow-conductivity proppant, comprising dumbbell-shaped framework granules and an oil-soluble film coating layer coated on surfaces of the dumbbell-shaped framework granules; wherein the dumbbell-shaped framework granules and the oil-soluble film coating layer form a spherical proppant, the dumbbell-shaped framework granules have a long diameter H of 400-825 um, an outer radius r of 10-15 um, an inner long radius Ra of 103-122 um, an inner short radius Rp of 85-170 um, and an inner diameter h of a trunk of 85-170 um;

the oil-soluble film coating layer melts upon contacting with oil at a temperature of 30-120° C., and a minimum thickness δ of the oil-soluble film coating layer is 12.5-25 um;

a granule size D of the high-flow-conductivity proppant is 425-850 um, and a relation among the granule size D, the long diameter H of dumbbell-shaped framework granules and the minimum thickness δ of the oil-soluble film coating layer is as follows: D=H+2δ;

the dumbbell-shaped framework granules comprise the following raw material components in percentage by weight:

70-80 wt % of Al$_2$O$_3$ powder, 1-10 wt % of TiO$_2$ powder, 4-12 wt % of MgO powder, and 2-8 wt % of CaCO$_3$ powder;

the oil-soluble film coating layer comprises the following raw material components in percentage by weight:

40-60 wt % of a petroleum resin, 30-50 wt % of a modified phenolic resin, 1-3 wt % of a surfactant, 3-6 wt % of hydroxypropyl cellulose and 0.1-0.5 wt % of dibutyl phthalate.

2. The high-flow-conductivity proppant of claim 1, wherein the high-flow-conductivity proppant has a bulk density of 1.2-1.5 g/cm$^3$, and the dumbbell-shaped framework granules have a bulk density of 2.4-2.7 g/cm$^3$.

3. The high-flow-conductivity proppant of claim 1, wherein a granule size of the Al$_2$O$_3$ powder is 1-5 um, a granule size of the TiO$_2$ powder is 0.5-1 um, a granule size of the MgO powder is 1-2 um, and a granule size of the CaCO$_3$ powder is 1-3 um.

4. The high-flow-conductivity proppant of claim 1, wherein the petroleum resin is any one of aliphatic resin, aromatic resin and alicyclic resin, the modified phenolic resin is any one of organosilicon modified phenolic resin and xylene modified phenolic resin, and the surfactant is any one of fatty acid monoglyceride and fatty acid diglyceride.

5. A preparation method of the high-flow-conductivity proppant of claim 1, comprising the following steps:

step 1: placing Al$_2$O$_3$ powder, TiO$_2$ powder, MgO powder and CaCO$_3$ powder into a ball mill in proportion for ball milling for 24 h to obtain a mixed powder, placing the mixed powder into a mixer, and adding an aluminum dihydrogen phosphate liquid and stirring to obtain a uniform mixture;

step 2: placing the uniform mixture obtained in step 1 into a dumbbell mould for molding to obtain dumbbell-shaped granules, and then placing the dumbbell-shaped granules into an oven for drying for 2-3 h;

step 3: placing the dried dumbbell-shaped granules obtained in step 2 into an electric furnace for sintering at 1320-1380° C. to form the dumbbell-shaped framework granules, and cooling for later use;

step 4: mixing petroleum resin, modified phenolic resin, surfactant and hydroxypropyl cellulose in proportion, heating to obtain a mixture in molten state, adding dibutyl phthalate to the mixture, and stirring uniformly to form a gel solution;

step 5: placing the dumbbell-shaped framework granules obtained in step 3 and the gel solution obtained in step 4 into a sugar coater and rotating until the gel solution is uniformly coated on the surfaces of the dumbbell-shaped framework granules to form the spherical proppant;

step 6: adding a lubricant into the spherical proppant obtained in step 5 and stirring uniformly, cooling and sieving to obtain a finished product, namely the high-flow-conductivity proppant.

6. The preparation method of claim 5, wherein in step 1, a mass ratio of the $Al_2O_3$ powder, $TiO_2$ powder, MgO powder and $CaCO_3$ powder is (70-80):(1-10):(4-12):(2-8), and an additive amount of the aluminum dihydrogen phosphate liquid is 2-5 wt % of the mass of the dumbbell-shaped framework granule raw material.

7. The preparation method of claim 5, wherein in step 4, a mass ratio of the petroleum resin, modified phenolic resin, surfactant, hydroxypropyl cellulose and dibutyl phthalate is (40-60):(30-50):(1-3):(3-6):(0.1-0.5).

8. The preparation method of claim 5, wherein in step 6, the lubricant is calcium stearate, and an additive amount of the lubricant is 1-2% of the mass of the high-flow-conductivity proppant.

* * * * *